United States Patent
Baust et al.

(10) Patent No.: US 7,082,383 B2
(45) Date of Patent: Jul. 25, 2006

(54) MAINTENANCE PLAN WORKBENCH AND METHOD

(75) Inventors: Christian Baust, Wiesloch (DE); Ferenc Peter, Walldorf (DE); Marek Poledna, Wiesloch (DE)

(73) Assignee: SAP AG, Walldorf (DE)

( * ) Notice: Subject to any disclaimer, the term of this patent is extended or adjusted under 35 U.S.C. 154(b) by 159 days.

(21) Appl. No.: 10/845,125

(22) Filed: May 14, 2004

(65) Prior Publication Data

US 2005/0187721 A1    Aug. 25, 2005

Related U.S. Application Data (60) Provisional application No. 60/546,977, filed on Feb. 24, 2004.

(51) Int. Cl.
G06F 15/00 (2006.01)

(52) U.S. Cl. .................................. 702/184; 707/104.1

(58) Field of Classification Search ............ 702/33–36, 702/58, 59, 68, 80, 90, 113, 114, 115, 121, 702/123, 182, 183, 184, 185; 705/1, 104.1
See application file for complete search history.

(56) References Cited

U.S. PATENT DOCUMENTS

| | | | | |
|---|---|---|---|---|
| 5,953,389 A | * | 9/1999 | Pruett et al. | 379/9 |
| 6,292,806 B1 | * | 9/2001 | Sandifer | 707/104.1 |
| 2002/0059075 A1 | * | 5/2002 | Schick et al. | 705/1 |
| 2002/0087220 A1 | * | 7/2002 | Tveit et al. | 700/22 |
| 2002/0161614 A1 | * | 10/2002 | Spira et al. | 705/7 |

* cited by examiner

Primary Examiner—Marc S. Hoff
Assistant Examiner—Mohamed Charioui
(74) Attorney, Agent, or Firm—Kenyon & Kenyon LLP (57) ABSTRACT

Embodiments of the present invention provide a method for managing a maintenance plan of a machine. The method may include analyzing data, retrieved from a plurality of sources, that makes up a maintenance plan for the machine or any of its components. The method may also include displaying the analysis in a consolidated view to a user. The embodiments may be implemented using a workbench, which is an analytical tool, implementable by processor software, hardware, or a combination thereof. Exemplary applications include aircraft maintenance.

6 Claims, 10 Drawing Sheets

MAINTENANCE PLAN WORKBENCH AND METHOD

CROSS REFERENCE TO RELATED APPLICATION

This application claims priority to U.S. Provisional Application Ser. No. 60/546,977, filed Feb. 24, 2004.

FIELD OF THE INVENTION

Embodiments of the present invention relate in general to a method for machine maintenance, and more particularly, to a method to manage a maintenance plan for a machine.

BACKGROUND

Machine maintenance is subject to various requirements as defined by manufacturers, regulatory agencies, and machine operators. These requirements may concern safety issues and/or other technical issues for various parts of the machine. These requirements are typically documented. Such documents include, for example, maintenance manuals, Maintenance Review Board (MRB) documents, structural repair manuals, wiring diagrams, general engineering manuals, and the like. The maintenance data from these documents may be stored in various formats and/or databases on the maintenance system.

Generally, the maintenance requirements originate from the manufacturer. When a machine is purchased, the owner receives various manuals and documents from the manufacturer that describe how to maintain the machine. These documents are often quite lengthy and complex (i.e., on average, each document may include many tasks). Each document may include various information including, but not limited to maintenance labor-hours estimates for tasks; facilities and tooling recommendations; recommended discretionary maintenance tasks improving maintenance economics, serviceability, and the like; and administrative process and planning information, including packing strategies.

To ensure that the machine is in compliance with the mandatory maintenance requirements, the machine is typically subject to routine checkups. Such a maintenance schedule is described in these documents as well. Because machines have many different components, some parts require checkups more frequently than others do. These routine checkups may take anywhere from a few hours to a few weeks.

Taking into account all of the aforementioned factors, engineers translate these documents into an operator-specific maintenance program when the maintenance requirement documents are received. These operator specific maintenance programs are then configured into job cards. The job cards are then grouped into work packages based on their maintenance schedule. Actual maintenance is performed according to the job cards on their effective dates.

These requirements are, however, constantly updated as any of the above mentioned entities may deem fit. These updates may involve various parts, which may have different maintenance plans and/or maintenance schedules. Additionally, it is also common for one operator to have more than one machine of different manufacturer and models, each of which requires its own maintenance requirements to maintain its workable condition. Thus, the maintenance system must be smart enough to determine which machine will be affected by the updated maintenance requirement, how it is to be applied to different machines, and when. Because the operator is responsible for the workable order of the machine, it is important to have a reliable monitoring system that keeps track of all these maintenance plans and schedules as well as updates.

Gathering the disparate and distributed required maintenance data in order to get a clear view of the maintenance status of a machine and its maintenance requirements can be problematic. The data may be stored in different formats and at different storage facilities, such that the operators responsible for maintaining the machine waste time tracking down and then consolidating the data in a manner that may help them assess the machine. Moreover, some data may be unintentionally omitted because the operators are unaware of it. The likelihood of such an omission increases when new or modified maintenance requirements are sent from regulatory agencies, manufacturers, and/or other operators. Or when mobile machines, e.g., aircraft and automobiles, are serviced in different places geographically. There is no seamless way for the new or modified requirements to be merged with the existing requirements. Furthermore, there is no way to perform quick and easy monitoring and analysis of the machine's workability.

Today, no known system provides a machine maintenance system or method that copes with all of the aforementioned obstacles. Accordingly, there is a need in the art for a way to manage maintenance plans including data from various sources in a single point of entry for ease of access, analysis, and display.

SUMMARY OF THE INVENTION

Embodiments of the present invention provide a method for managing a maintenance plan of a machine. The method may include analyzing data, retrieved from a plurality of sources, that makes up a maintenance plan for the machine or any of its components. The method may also include displaying the analysis in a consolidated view to a user. The embodiments may be implemented using a workbench, which is an analytical tool, implementable by processor software, hardware, or a combination thereof.

The method may advantageously provide a single point of entry to the user for managing the maintenance plan for a machine or its components to provide quick and easy analysis. The method may also advantageously provide the user with a consolidated view of disparate and distributed data that make up the maintenance plan. As a result, the user may quickly and easily assess maintenance status and whether the machine is in compliance with requirements.

BRIEF DESCRIPTION OF DRAWINGS

FIG. 7 is an example of a compliance report to show whether a maintenance plan is being complied with.

DETAILED DESCRIPTION

Embodiments of the present invention may provide a method for managing a maintenance plan of a machine using a maintenance plan workbench. A workbench may be an analytical tool through which a user or machine may manage a large quantity of disparate and distributed data, including sending and receiving the data from multiple distributed sources, consolidating the data into related groups via, e.g., data links, computing results from the data, and displaying the data and results. The tool may be implemented on processor software, hardware, or a combination of both. In embodiments of the present invention, the maintenance plan workbench may include an interface tool through which the user may send and receive maintenance data, an application tool that analyzes the data, and a database tool that manages data storage and retrieval.

A method of an embodiment of the present invention may include, in response to a maintenance request regarding one or more machine components, analyzing maintenance data, from multiple sources, that make up the maintenance plan. The method may include displaying a consolidated view of the analysis to the user. The analysis may include displaying maintenance data regarding the machine components, generating a compliance report of the machine components, updating the maintenance plan of the machine components, or creating the maintenance plan of the machine components. The consolidated view may include related data from multiple sources displayed concurrently to the user.

Embodiments of the present invention may also provide a maintenance plan workbench for managing a maintenance plan of a machine. The workbench may include a graphical user interface to receive a maintenance request from a user and display a consolidated view of the maintenance plan in response to the maintenance request. The workbench may also include an application to analyze maintenance plan data in response to the maintenance request and transmit the analysis to the graphical user interface for display to the user. The workbench may include a database interface to transmit data between the application and one or more databases for storing the maintenance plan. An example of a workbench will be described later in FIG. 3.

Embodiments of the present invention may advantageously provide a single point of entry to the user for maintenance plan management to provide real-time analysis of a machine's maintenance. Embodiments may also advantageously provide the user with a consolidated view of all maintenance plan data that may be stored in distributed fashion and in different formats. Accordingly, the user may be able to quickly and frequently ensure that the machine is in compliance with its maintenance requirements.

Figure 1:
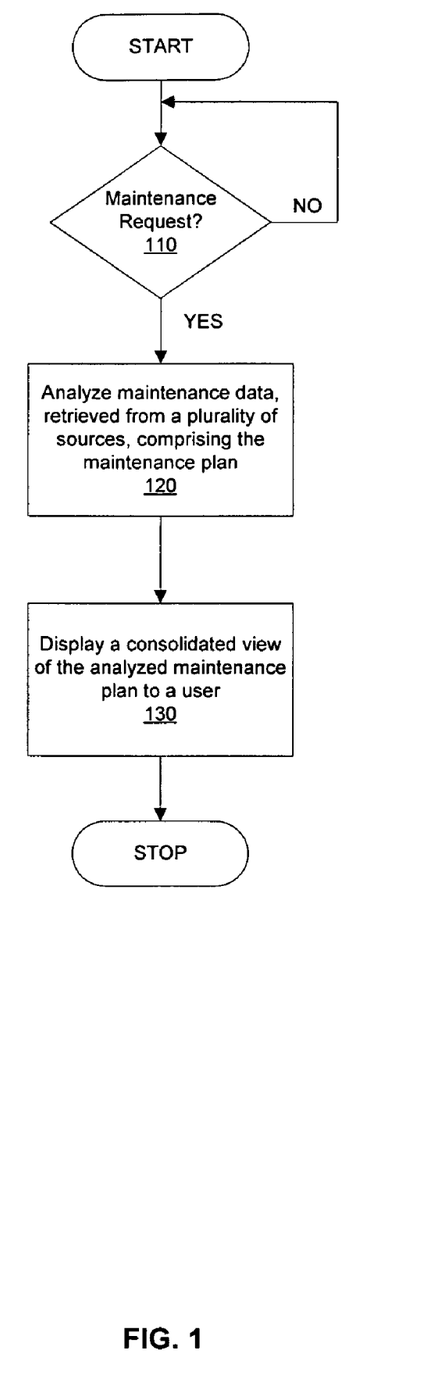
FIG. 1 is a method for managing a maintenance plan in accordance with an embodiment of the present invention.

FIG. 1 is a method for managing a maintenance plan in accordance with an embodiment of the present invention. The workbench may await (110) a maintenance request for maintenance data about a machine or one or more of the machine's components. A user or a processor may send the maintenance request. Examples of maintenance requests may include requests to display maintenance data, e.g., maintenance status, to update a maintenance plan, to create a maintenance plan, to generate a compliance report indicating whether the machine has completed all its required maintenance or whether the machine complies with maintenance requirements, or any other such request related to maintenance. In one embodiment, the maintenance request may be made in the form of a request for documents that include the requested maintenance data and/or maintenance plan.

Upon receipt of the request, the workbench may analyze (120) maintenance data, retrieved from multiple sources, that makes up the maintenance plan of the machine or relevant machine components. The maintenance data sources may include multiple databases, floppy disks, CD-ROM, hard drives, or any such device capable of storing data.

The maintenance plan may include disparate and distributed data to be analyzed in order to produce a complete view of the machine. For example, the maintenance plan may include documents describing the maintenance requirements for the machine and its components, machine and component specifications, task lists detailing the tasks to be performed according to the maintenance requirements, maintenance status reports either existing or to be generated, and links between the documents, specifications, task lists, and maintenance status reports to illustrate how these data are related to each other, the machine, and the machine's components and where the data may be found. An example of the links between data will be described later in FIG. 5.

In FIG. 1, after the workbench analyzes (120) the maintenance plan, the workbench may display (130) a consolidated view of the analysis to a user. The consolidated view may include the disparate and distributed data and the analysis results in a single display. This single display may allow the user to quickly and easily assess the actual status of the machine and the machine's components, without having to manually access multiple data sources.

It is to be understood that the maintenance request is not limited to those described herein, but may include any request regarding the machine or machine components. It is further to be understood that the maintenance data comprising the maintenance plan is not limited to that described herein, but may include any machine data that may be used to assess the machine.

Figure 2:
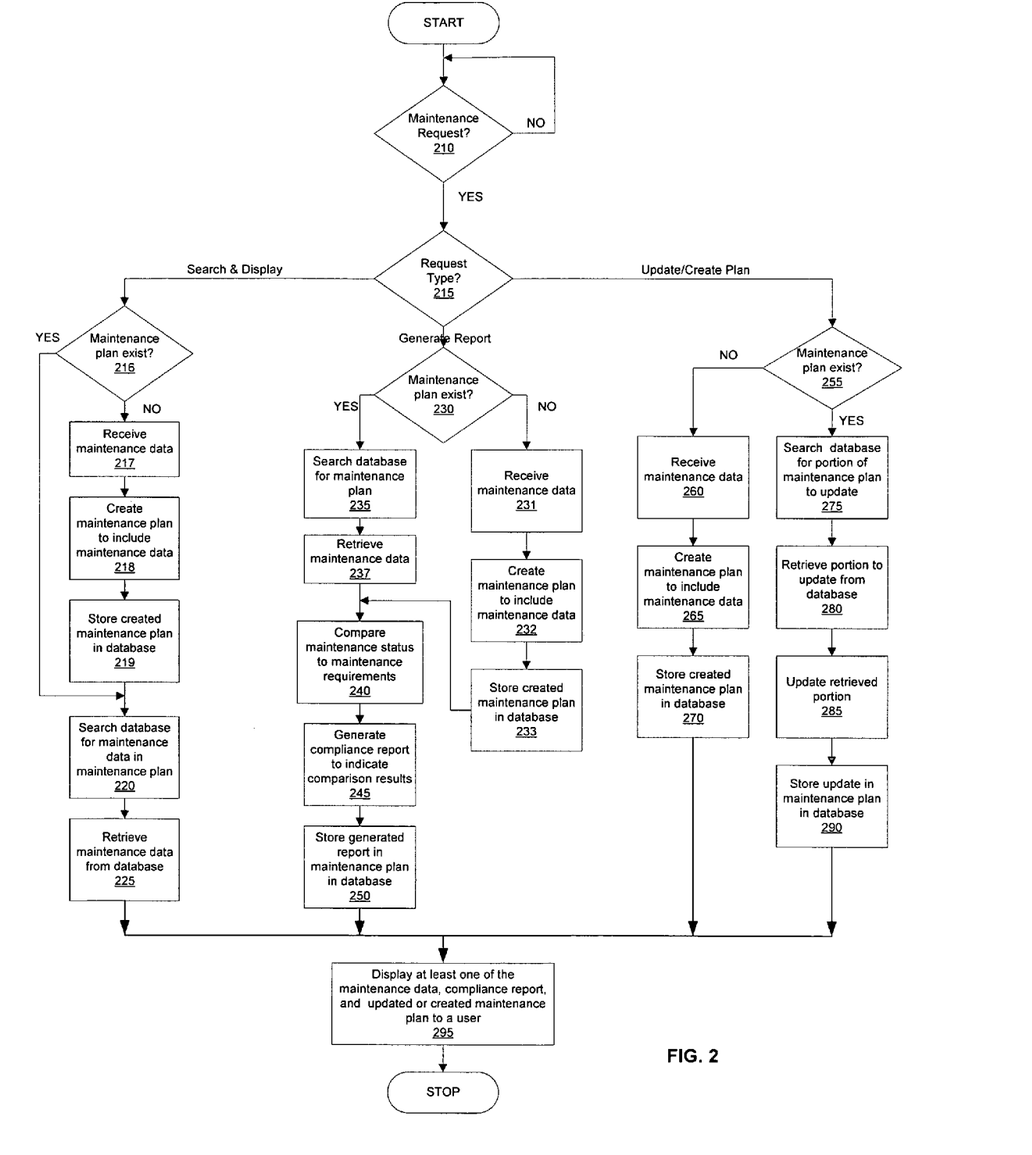
FIG. 2 is a method for managing a maintenance plan in accordance with an alternate embodiment of the present invention.

FIG. 2 is a method for managing a maintenance plan in accordance with an alternate embodiment of the present invention. The workbench may await (210) a maintenance request from a user or a processor regarding a machine or one or more of the machine's components. The workbench may determine (215) the request type. If the maintenance request is to search the maintenance plan and display requested data, the workbench may determine (216) whether the maintenance plan already exists. If the maintenance plan already exists, the workbench may search (220) one or more databases and/or other storage media in which the requested data may be stored. The workbench may retrieve (225) the maintenance data. The workbench may display (295) the retrieved data to a user.

The workbench may employ any method to search for the maintenance data relevant to the request. In one embodiment, the workbench may parse the request to identify keywords. The workbench may then perform a keyword search of the storage media to retrieve maintenance data associated with the keywords. Alternatively, the workbench may search a lookup table to find the keywords and the corresponding storage media locations of the relevant data. In another embodiment, the workbench may display a selectable machine or component list to the user and, upon receiving the user's selection, search for the data.

If the workbench determines (216) that the maintenance plan does not exist, the workbench may request and receive (217) maintenance plan data from the user or a processor. The workbench may create (218) the maintenance plan to include the received maintenance data. The workbench may store (219) the created maintenance plan in one or more databases and/or other storage media according to the storage protocol of the particular application.

After the workbench creates (217, 218, 219) the maintenance plan, the workbench may search (220) and retrieve (225) the requested maintenance data from storage, in accordance with embodiments of the present invention. The workbench may display (295) the retrieved data to the user.

In FIG. 2, if the maintenance request is to generate a compliance report to determine whether the machine has completed all its required maintenance or whether the machine complies with maintenance requirements, for example, the workbench may determine (230) whether the maintenance plan already exists. If the maintenance plan already exists, the workbench may search (235) one or more databases and/or other storage media for the maintenance plan and current maintenance status. The workbench may retrieve (237) the maintenance plan and maintenance status. The workbench may compare (240) the current maintenance status to the maintenance requirements. The workbench may generate (245) a compliance report to show the comparison results. The workbench may store (250) the generated compliance report as part of the maintenance plan. The workbench may display (295) the generated compliance report to the user.

If the workbench determines (230) that the maintenance plan does not exist, the workbench may request and receive (231) maintenance plan data from the user or a processor. The workbench may create (232) the maintenance plan to include the received maintenance data. The workbench may store (233) the created maintenance plan in one or more databases and/or other storage media according to the storage protocol of the particular application.

After the workbench creates (231, 232, 233) the maintenance plan, the workbench may perform (235, 237, 240, 245, 250) the compliance report generation and display (295) the generated compliance report to the user.

In FIG. 2, if the maintenance request is to update or create the maintenance plan, the workbench may determine (255) whether the maintenance plan already exists. If the maintenance plan already exists, the workbench may update the maintenance plan. The workbench may search (275) one or more databases and/or other storage media for the portion of the maintenance plan to update. The workbench may retrieve (280) the portion. The workbench may update (285) the retrieved portion with new or modified maintenance data received from the user or a processor. The workbench may store (290) the updated portion of the maintenance plan and display (295) the updated portion of the maintenance plan to the user.

If the workbench determines (255) that the maintenance plan does not exist, the workbench may create the maintenance plan. The workbench may request and receive (260) maintenance plan data from the user or a processor. The workbench may create (265) the maintenance plan to include the received maintenance data. The workbench may store (270) the created maintenance plan in one or more databases and/or other storage media according to the storage protocol of the particular application. The workbench may display (295) the created maintenance plan to the user.

Figure 3:
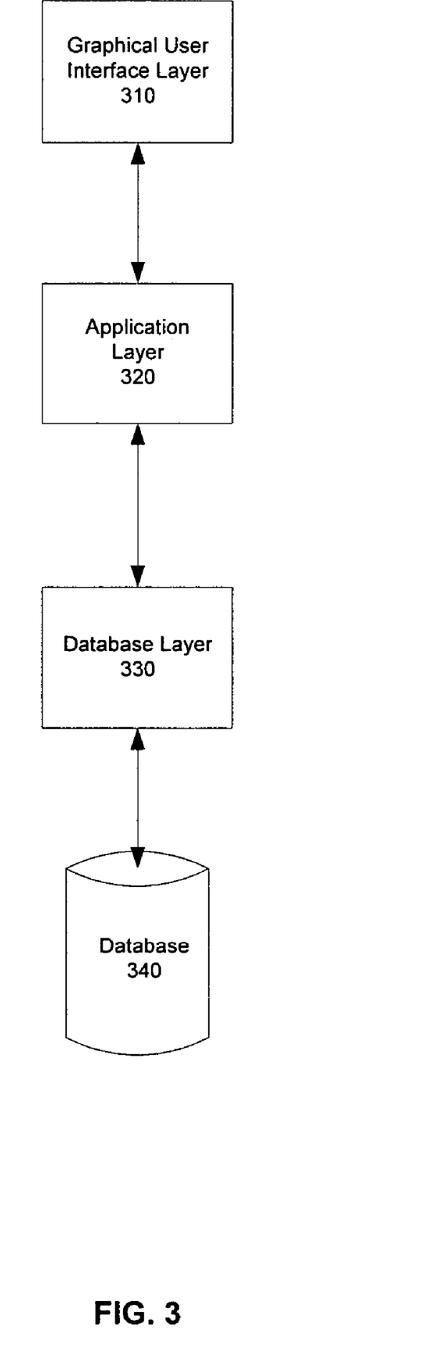
FIG. 3 is a block diagram of a workbench architecture to manage a maintenance plan in accordance with an embodiment of the present invention.

FIG. 3 is a block diagram of a workbench architecture to manage a maintenance plan in accordance with an embodiment of the present invention. The architecture may include graphical user interface layer 310, application layer 320, and database layer 330. Graphical user interface layer 310 may receive a maintenance request and maintenance data from a user or a processor and display a consolidated view of the maintenance plan in response to the maintenance request. Application layer 320 may receive the maintenance request and maintenance data from graphical user interface layer 310 and analyze the maintenance plan in response to the maintenance request. Application layer 320 may use maintenance data received from the user or a processor, maintenance data retrieved from storage, or both to analyze the maintenance plan. Application layer 320 may transmit the analysis back to graphical user interface layer 310 for display to the user. Database layer 330 may transmit maintenance data between application layer 320 and storage. In one embodiment, storage may include one or more databases 340.

It is to be understood that the workbench architecture is not limited to that described herein, but may include additional elements to be used to manage a maintenance plan.

Figure 4:
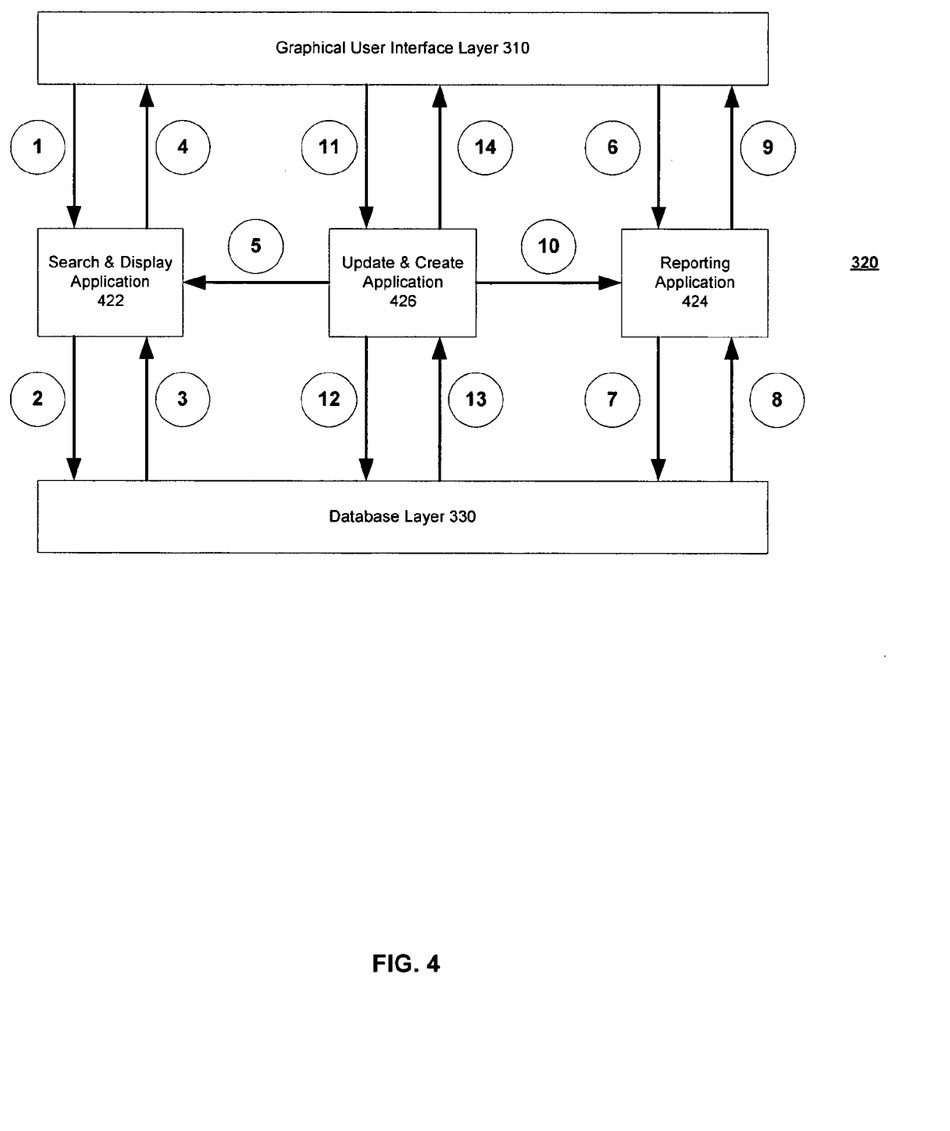
FIG. 4 is a block diagram of an application layer of a workbench architecture to manage a maintenance plan in accordance with an embodiment of the present invention.

FIG. 4 is a block diagram of an application layer of a workbench architecture to manage a maintenance plan in accordance with an embodiment of the present invention. FIG. 4 illustrates elements that may comprise application layer 320. Application layer 320 may include search and display application 422, reporting application 424, and update and create application 426. Search and display application 422 may handle a maintenance request to display maintenance data of the machine or machine components. Reporting application 424 may handle a maintenance request to generate a maintenance compliance report for the machine or machine components. Update and create application 426 may handle a maintenance request to update or create the maintenance plan for the machine or machine components.

FIG. 4 also illustrates the data flow between graphical user interface layer 310, application layer 320, and database layer 330, and between application layer elements 422, 424, and 426. For example, search and display application 422 may receive (1) a maintenance request for maintenance data and/or an input of maintenance data from the user or a processor via graphical user interface layer 310. Search and display application 422 may request (2) maintenance data from and send (2) maintenance data to storage via database layer 330 in accordance with the received maintenance request. Search and display application 422 may receive (3) requested maintenance data from storage via database layer 330. Search and display application 422 may send (4) requested maintenance data to graphical user interface layer 310 to display to the user. If a maintenance plan related to the maintenance request does not exist, search and display application 422 may access the plan creation functions of update and create application 426 to create and receive (2) the newly created maintenance plan from update and create application 426.

In FIG. 4, for example, reporting application 424 may receive (6) a maintenance request to generate compliance reports and/or an input of maintenance data from the user or a processor via graphical user interface layer 310. Reporting application 424 may request (7) maintenance data, e.g., current maintenance status and maintenance requirements in the maintenance plan, from and send (7) maintenance data, e.g., generated compliance reports, to storage via database layer 330 in accordance with the received maintenance request. Reporting application 424 may receive (8) requested maintenance data from storage via database layer 330 and generate a compliance report therefrom. Reporting application 424 may send (9) the generated compliance report to graphical user interface layer 310 to display to the user. If the maintenance plan related to the maintenance request does not exist, reporting application 424 may access the plan creation functions of update and create application 426 to create and receive (10) the newly created maintenance plan from update and create application 426.

In FIG. 4, for example, update and create application 426 may receive (11) a maintenance request to create or update a maintenance plan and/or an input of maintenance data from the user or a processor via graphical user interface layer 310. Update and create application 426 may request (12) maintenance data, e.g., a portion of the maintenance plan to be updated, from and send (12) maintenance data, e.g., an updated portion of the maintenance plan or a new maintenance plan, to storage via database layer 330 in accordance with the received maintenance request. Update and create application 426 may receive (13) requested maintenance data from storage via database layer 330 and use the received data during the update and/or creation of the maintenance plan. Update and create application 426 may send (14) the updated or new maintenance plan to graphical user interface layer 310 to display to the user.

Figure 5:
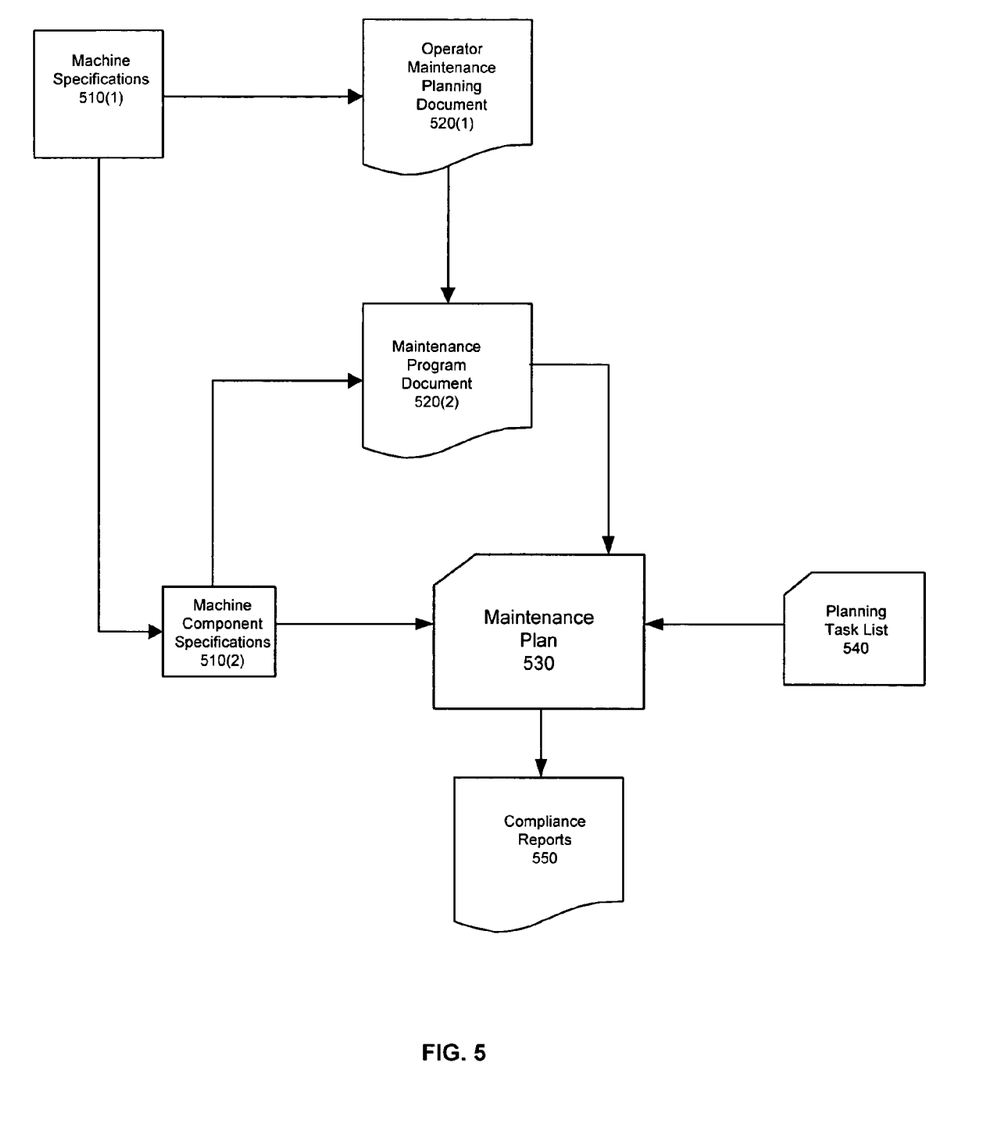
FIG. 5 is an illustration of maintenance data comprising a maintenance plan in accordance with an embodiment of the present invention.

FIG. 5 is an illustration of maintenance data comprising a maintenance plan in accordance with an embodiment of the present invention. In this embodiment, maintenance plan 530 may include specifications, such as machine specifications 510(1) and machine component specifications 510(2); documents, such as operator maintenance planning (OMP) document 520(1) and maintenance program (MPO) document 520(2); planning task list 540; and compliance reports 550.

It is to be understood that the maintenance data comprising the maintenance plan is not limited to that described herein, but may include any data that may be used in maintenance planning and management.

In FIG. 5, machine specifications 510(1) may include the materials that make up the machine and the machine components and their functional locations in the machine. A functional location of a component may be represented in machine specifications 510(1) as a data record, including the component's location relevant to adjacent components and/or the machine as a whole and links to corresponding data records for adjacent components. For example, machine specifications 510(1) for an airplane may include a material listing including the particular airplane metal, the wheel rubber, electronics wiring, etc. Machine specifications 510(1) for the airplane may also include a component listing including the wheel, the right and left wings, the rudder, etc., and the functional locations of each. The right wing may be described as functionally located next to the fuselage on the right side and in the vertical and horizontal middle of the fuselage. The right wing data record may include the locations relevant to the fuselage, i.e., right side, vertical middle, and horizontal middle, and links to the fuselage data record.

Machine component specifications 510(2) may similarly include the materials that make up the machine components and the subcomponents and their functional locations in each machine component. A functional location of a subcomponent may similarly be represented in machine component specifications 510(2) as a data record, including the subcomponent's location relevant to adjacent subcomponents, the component as a whole, adjacent components, and/or the machine as a whole and links to corresponding data records for the adjacent subcomponents and for the component. As in the example above, machine component specifications 510(2) for the right wing may include a material listing including the particular wing metal, electronic wiring, bolts, hydraulic fluids, etc. Machine component specifications 510(2) for the right wing may also include a subcomponent listing including the wing flaps, the hydraulic lifts, etc., and the functional locations of each. The middle wing flap may be described as functionally located on the rear wing surface, in the horizontal center of the wing, and above the hydraulic lifts. The middle wing flap data record may include the locations relevant to the hydraulic lifts, i.e., above, and links to the hydraulic lifts data record. The middle right wing data record may also include the locations relevant to the right wing, i.e., rear and center, and a link to the right wing data record.

The workbench may represent machine specifications 510(1) and machine component specifications 510(2) hierarchically, where machine specifications 510(1) may comprise the highest level in the specification hierarchy and include the overall machine specifications. The workbench may provide machine specifications 510(1) to machine component specifications 510(2). Machine component specifications 510(2) may comprise a lower level in the specification hierarchy and further break down machine specifications 510(1) into the machine components' and subcomponents' specifications.

One or more sets of machine specifications 510(1) and machine component specifications 510(2) may be included in maintenance plan 530.

In FIG. 5, operator maintenance planning (OMP) document 520(1) may include maintenance requirements at the machine level. These maintenance requirements may include a detailed description of how and when the machine is to be maintained. OMP document 520(1) may receive machine specifications 510(1) to coordinate with machine maintenance requirements. Maintenance program (MPO) document 520(2) may include maintenance requirements at the machine component and subcomponent level. These component maintenance requirements may include detailed descriptions of how, when, and what components and subcomponents are to be maintained. MPO document 520(2) may receive machine component and subcomponent specifications from machine component specifications 510(2) to coordinate with machine component and subcomponent maintenance requirements.

The workbench may represent OMP document 520(1) and MPO document 520(2) hierarchically, where OMP document 520(1) may comprise the highest level in the document hierarchy and include detailed overall maintenance requirements for the machine. The workbench may provide the overall requirements from OMP document 520(1) to MPO document 520(2). MPO document 520(2) may comprise a lower level in the document hierarchy and further break down the requirements from OMP document 520(1) into detailed requirements for the machine components and subcomponents.

One or more OMP documents 520(1) and MPO documents 520(2) may be included in maintenance plan 530.

At an intermediate level in the document hierarchy, one or more maintenance grouping (MPG) documents (not shown) may be included between OMP document 520(1) and MPO document 520(2) to group machine requirements from OMP document 520(1) logically, which results in the same groupings for the machine component and subcomponent requirements. The MPG document may group the machine requirements using spatial, technical, or functional criteria, for example.

Other documents may also be included as maintenance data in maintenance plan 530. For example, an engineering order in which a change to the machine configuration and/or a change to the maintenance plan may be included. A directive from a regulatory agency that mandates a particular maintenance schedule may be included. A manufacturer service bulletin in which the manufacturer has discovered or been provided with new requirements about the machine may be included. An operator service request in which the machine operator requests routine or specific maintenance to repair a problem or prolong the life of the machine may be included. These other documents may be merged into OMP document 520(1) and/or MPO document 520(2).

In FIG. 5, planning task list 540 may include a listing of maintenance activities to be performed on the machine and/or machine components and subcomponents. The activities may be grouped by component or subcomponent, function, location in the machine, or relevant maintenance plan, i.e., routine or special maintenance plans, for example. Maintenance plan 530 may include one or more planning task list 540, each list corresponding to a particular grouping. In the previous example, planning task list 540 for routine maintenance of the right wing may include such activities as checking the hydraulic fluid level, checking for stress fractures, measuring response time in the wing flaps, etc.

In FIG. 5, compliance reports 550 may be generated from maintenance plan 530 in response to a request from a user or a processor. Compliance reports 550 may be generated based on machine specifications 510(1), machine component specifications 510(2), OMP document 520(1), MPO document 520(2), planning task list 540, and any other maintenance data in maintenance plan 530. Examples of compliance reports 550 may include reports that the machine or machine components and subcomponents are in compliance with maintenance requirements, that maintenance is due or should be done, that maintenance plan 530 has been updated, that maintenance plan 530 has been created, and that maintenance is complete.

In FIG. 5, maintenance plan 530 may receive and consolidate the maintenance data from machine specifications 510(1), machine component specifications 510(2), OMP document 520(1), MPO document 520(2), planning task list 540, and any other maintenance data.

Figure 6:
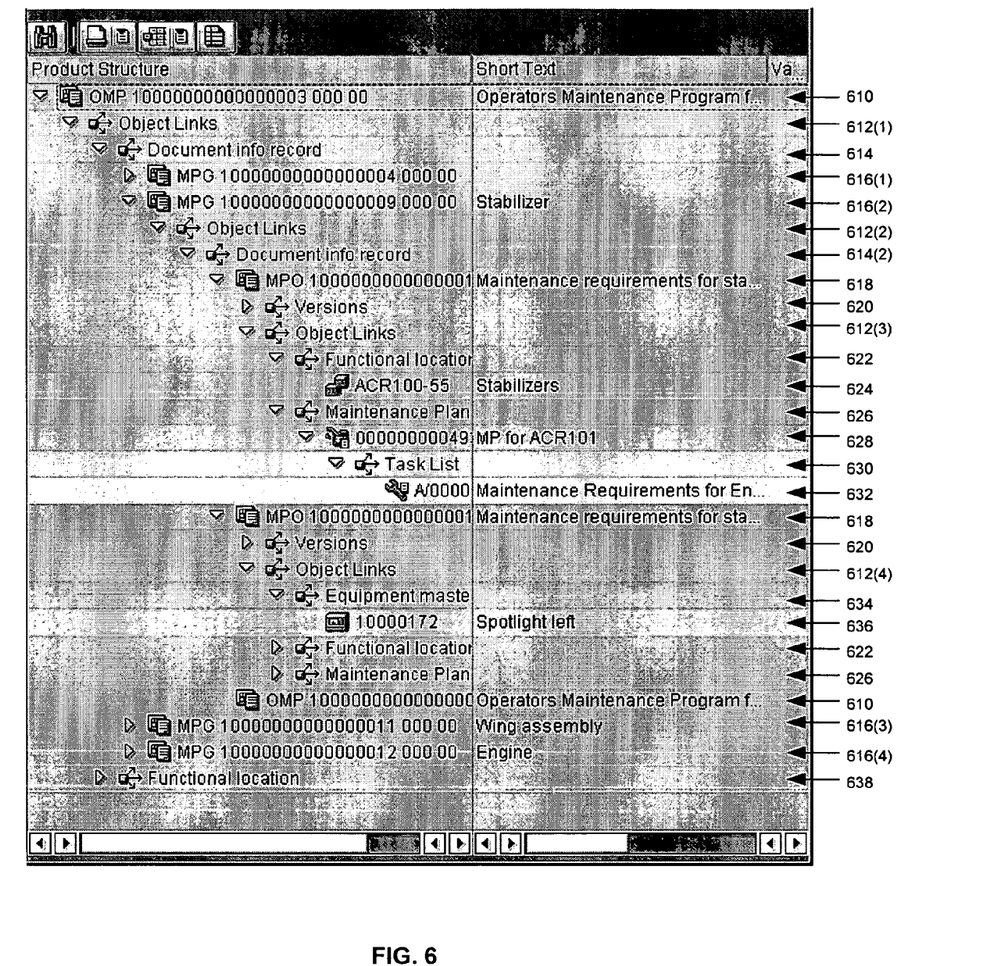
FIG. 6 is an example of a hierarchical display of maintenance data comprising a maintenance plan in accordance with an embodiment of the present invention.

FIG. 6 is an example of a hierarchical display of maintenance data comprising a maintenance plan in accordance with an embodiment of the present invention. FIG. 6 is an example of a display that may be shown to the user in response to a request to search a maintenance plan and display the requested data. In this example, the user requested a search to show the maintenance requirements for an aircraft. The workbench searched the maintenance plan in storage and determined that the requested requirements were described in OMP document 610. The workbench generated a hierarchical display of consolidated maintenance data associated with OMP document 610 for the aircraft. In this example, OMP document 610 is listed at the top of the document hierarchy in this display. The next level in the hierarchy includes documents 616(1) through 616(4) under heading "Document info record" 614 and other maintenance data under heading "Functional location" 638. OMP document 610 is linked to documents 616(1) through 616(4) and other maintenance data 638 via object link 612(1). Under heading "Document info record" 614 are intermediate level MPG documents 616(1) through 616(4). In this example, MPG document 616(2) groups aircraft maintenance requirements pertaining to the aircraft stabilizer. MPG document 616(3) groups aircraft maintenance requirements pertaining to the wing assembly. MPG document 616(4) groups aircraft maintenance requirements pertaining to the aircraft engine.

MPG document 616(2) may also link to lower level MPO document 618 via object link 612(2). MPO document 618 may include the maintenance requirements for stabilizer ACR100-55. As such, MPO document 618 may link to aircraft component and subcomponent functional location data 624 under heading "Functional location" 622 and to maintenance plan data 628 under heading "Maintenance plan" 626 via object link 612(3) and to specifications 636 under heading "Equipment master" 634 via object link 612(4). In this example, MPO document 618 includes the maintenance requirements for maintaining stabilizer ACR100-55. The maintenance requirements comprise functional location data 624, maintenance plan data 628 for aircraft ACR101, which includes stabilizer ACR100-55, and aircraft specification data 636 for stabilizer subcomponent, spotlight left. Maintenance plan data 628 also includes task list data 632 under heading "Task list" 630, which includes the activities to be performed for maintenance on stabilizer ACR100-55. MPO document 618 also includes version 620 of MPO document 618, which may allow the user to identify which maintenance requirements are currently in place.

In an alternate embodiment, maintenance data comprising a maintenance plan may be displayed graphically, as shown in FIG. 5, for example, instead of hierarchically.

Figure 7:
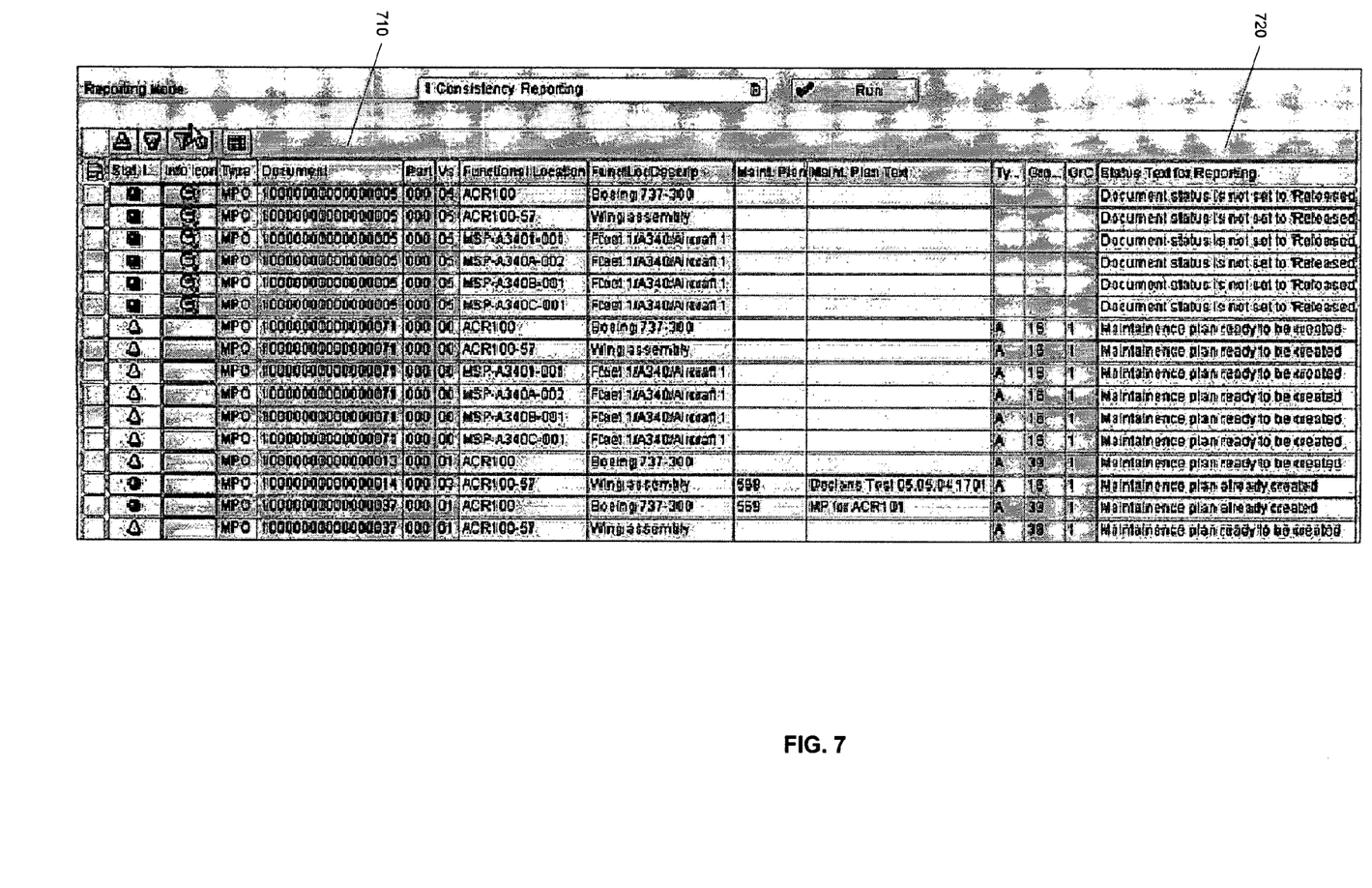

FIG. 7 is an example of a compliance report to show whether a maintenance plan is being complied with. FIG. 7 is an example of a display that may be shown to the user in response to a maintenance request to generate a compliance report. In this example, a user or a processor requested that a report be generated to indicate whether a maintenance plan has been created for machines and machine components, e.g., a wing assembly, a Boeing 737-300 aircraft, etc. Prior to this maintenance request, the user or a processor inputted the maintenance requirements for these machines and components. The workbench generated the MPO documents from the inputs.

In this example, MPO documents 710 that include maintenance requirements for the machines and machine components are displayed with the status 720 of their respective maintenance plans. In FIG. 7, the status of some maintenance plans indicate that the indicated MPO document 710 including the maintenance requirements has not yet been "Released," i.e., linked to the corresponding maintenance plan. In other cases, the maintenance plan has all its maintenance data and is ready to be created to include the maintenance requirements in the indicated MPO document 710. In still other cases, the maintenance plan has been created and includes the maintenance requirements in the indicated MPO document 710. The compliance report advantageously allows the user to quickly assess what needs to be done regarding these machines and components.

It is to be understood that the compliance reports are for illustration purposes only, as other implementations may be used to display compliance analysis.

Figure 8A:
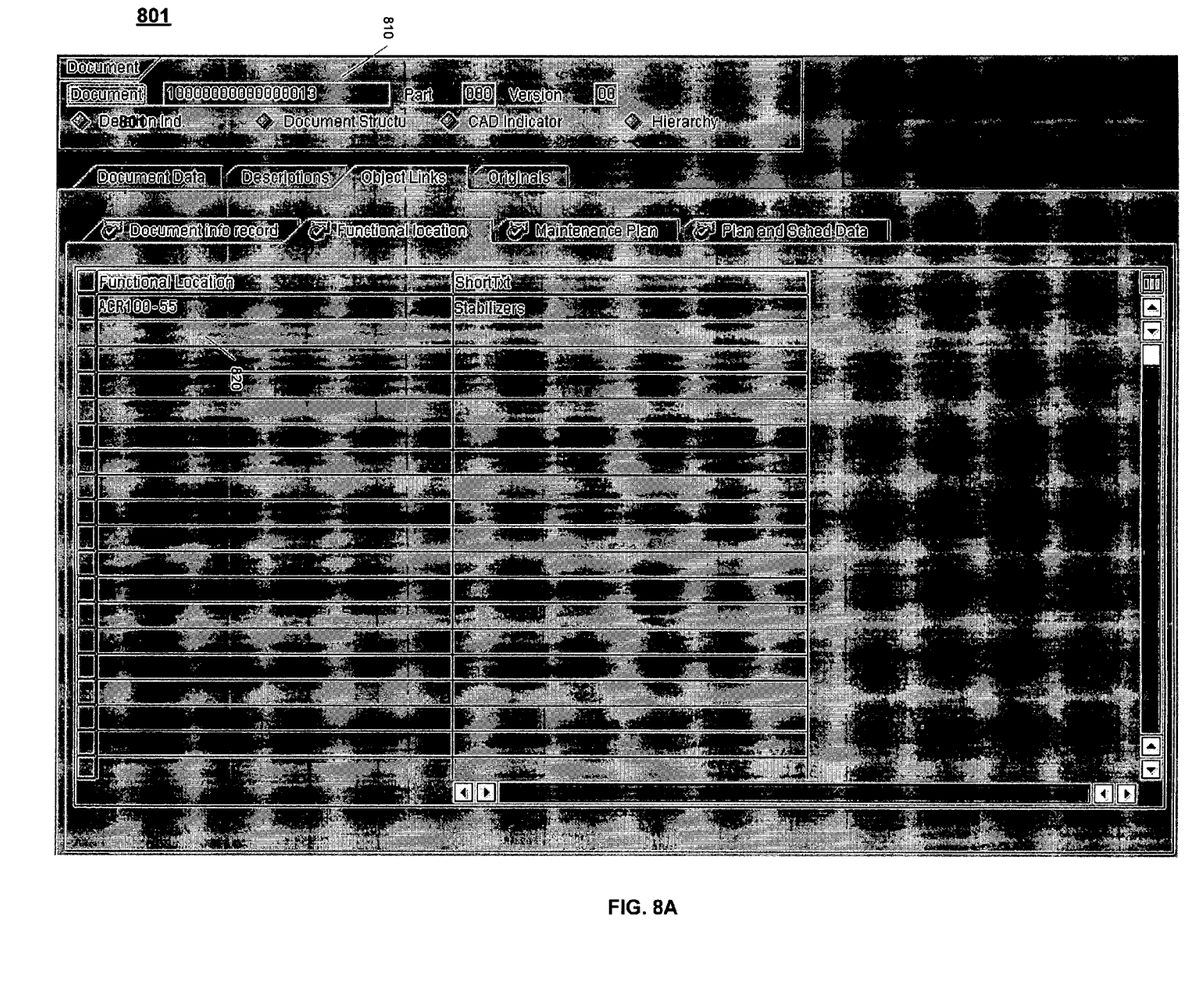
FIGS. 8A and 8B are examples of illustrating an update to a maintenance plan in accordance with an embodiment of the present invention.
Figure 8B:
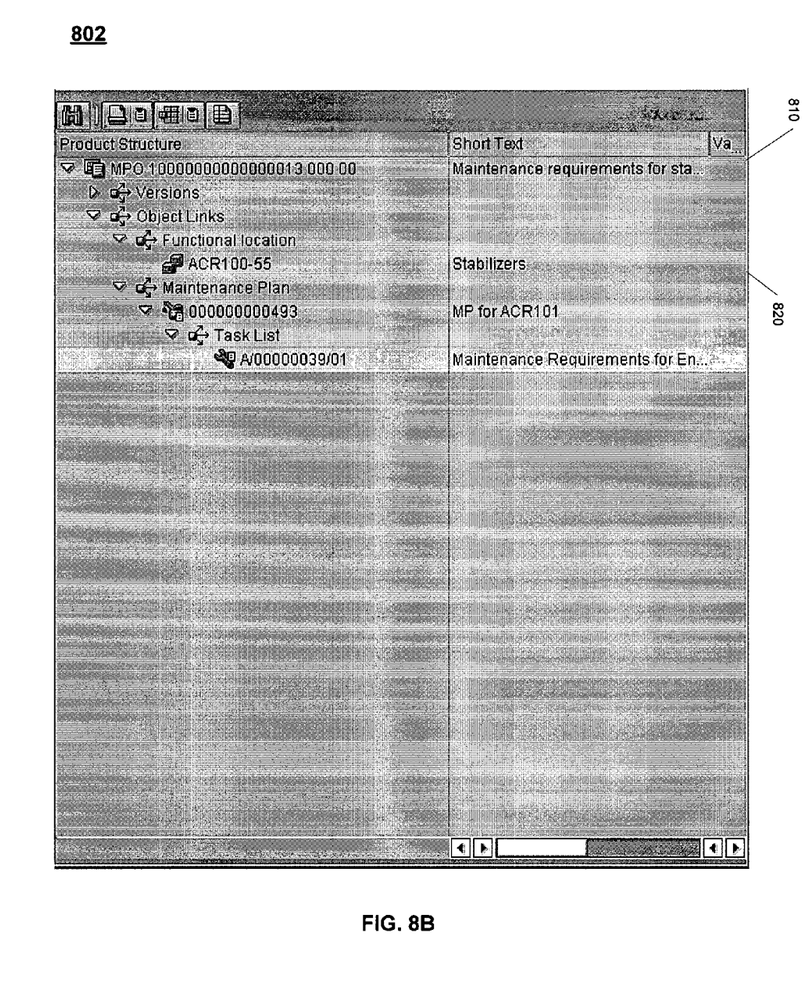

FIGS. 8A and 8B are examples of an update to a maintenance plan in accordance with an embodiment of the present invention. FIG. 8A is an example of a display that may be shown to the user in response to a request to update a maintenance plan. Here, the user or a processor requested that MPO document 810 be updated to link with functional location data 820 of stabilizer ACR100-55. The workbench displayed window 801 showing the requested machine document 810 to be updated. The user inputted functional location data 820 as the updating information. FIG. 8B shows hierarchical display 802 that was generated after the updated data was inputted to the workbench. FIG. 8B includes MPO document 810 as now linked with functional location data 820 in the maintenance plan. Accordingly, the maintenance requirements in MPO document 810 were easily and quickly updated to include maintenance requirements for stabilizer ACR100-55.

It is to be understood that FIGS. 8A and 8B are for illustration purposes only, as other implementations may be used to update a maintenance plan.

Figure 9:
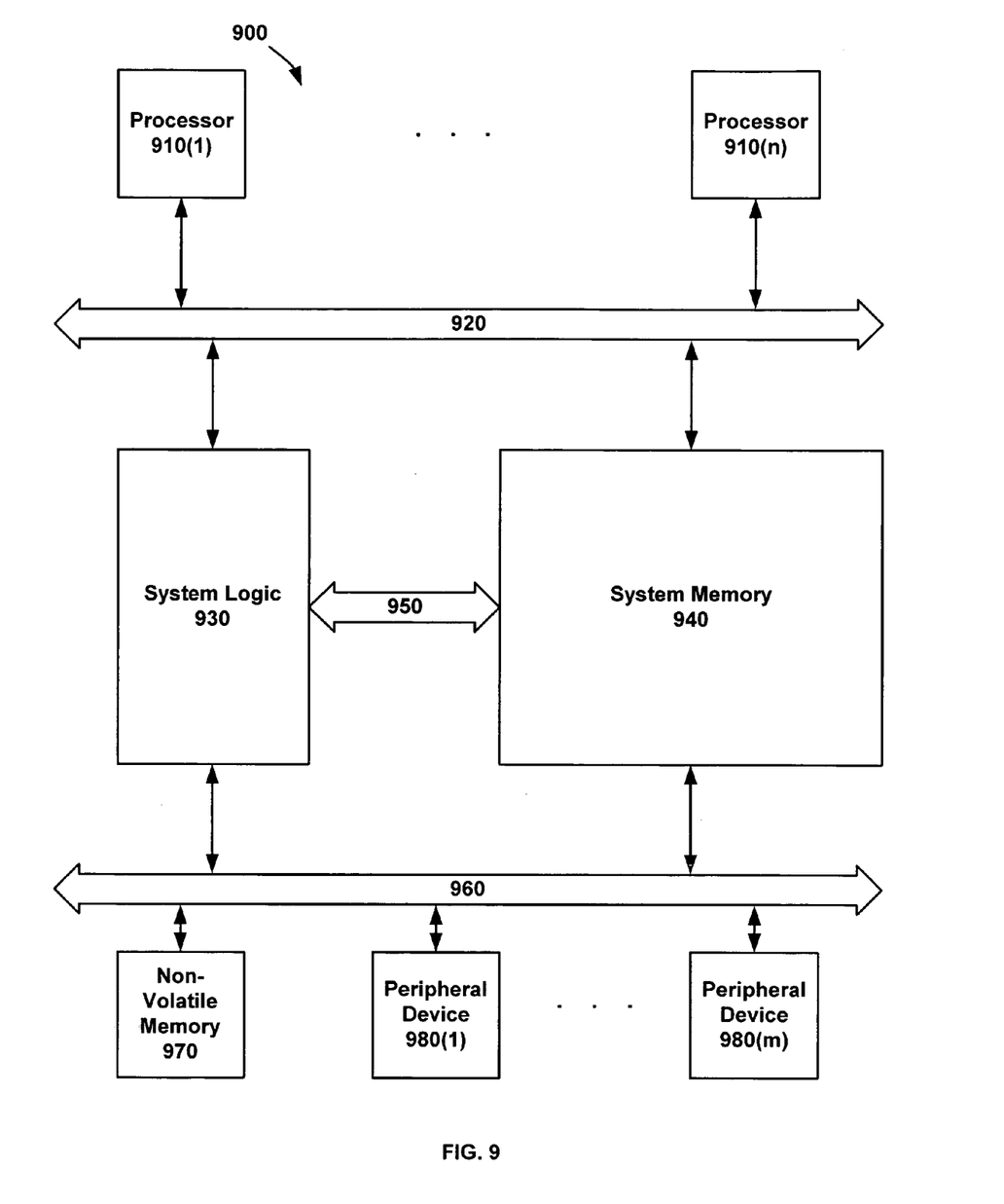
FIG. 9 is a block diagram of a computer system for implementing an embodiment of the present invention.

FIG. 9 is a block diagram of a computer system, which may include an architectural state, including one or more processors and memory for use in accordance with an embodiment of the present invention. In FIG. 9, a computer system 900 may include one or more processors 910(1)–910(n) coupled to a processor bus 920, which may be coupled to a system logic 930. Each of the one or more processors 910(1)–910(n) may be R-bit processors and may include a decoder (not shown) and one or more R-bit registers (not shown). System logic 930 may be coupled to a system memory 940 through a bus 950 and coupled to a non-volatile memory 970 and one or more peripheral devices 980(1)–980(m) through a peripheral bus 960. Peripheral bus 960 may represent, for example, one or more Peripheral Component Interconnect (PCI) buses, PCI Special Interest Group (SIG) PCI Local Bus Specification, Revision 2.2., published Dec. 18, 1998; industry standard architecture (ISA) buses; Extended ISA (EISA) buses, BCPR Services Inc. EISA Specification, Version 3.12, 1992, published 1992; universal serial bus (USB), USB Specification, Version 1.1, published Sep. 23, 1998; and comparable peripherable buses. Non-volatile memory 970 may be a static memory device such as a read only memory (ROM) or a flash memory. Peripheral devices 980(1)–980(m) may include, for example, a keyboard; a mouse or other pointing devices; mass storage devices such as hard disk drives, compact disc (CD) drives, optical disks, and digital video disc (DVD) drives; displays and the like.

Embodiments of the present invention may be implemented using any type of computer, such as a general-purpose microprocessor, programmed according to the teachings of the embodiments. The embodiments of the present invention thus may also include a machine readable medium, which may include instructions used to program a processor to perform a method according to the embodiments of the present invention. This medium may include, but is not limited to, any type of disk including floppy disk, optical disk, and CD-ROMs.

It may be understood that the structure of software used to implement the embodiments of the invention may take any desired form, such as a single or multiple programs. It may be further understood that the method of an embodiment of the present invention may be implemented by software, hardware, or a combination thereof.

The above is a detailed discussion of the preferred embodiments of the invention. The full scope of the invention to which applicants are entitled is defined by the claims hereinafter. It is intended that the scope of the claims may cover other embodiments than those described above and their equivalents.

What is claimed is:

1. A method for managing a maintenance plan of a machine, comprising:
    responsive to a request, analyzing maintenance data, retrieved from a plurality of sources, comprising the maintenance plan of at least one equipment component of the machine; and
    displaying a consolidated view of the analyzed maintenance plan of the at least one equipment component to a user, the consolidated view comprising:
        documents that include maintenance requirements for the at least one equipment component;
        equipment specifications of the at least one equipment component and subcomponents of the at least one equipment component; planning task lists to describe activities to be performed in accordance with the maintenance requirements;
        reports to be generated about maintenance compliance of the at least one equipment component; and
        relationships between the documents, the equipment specifications, the planning task lists, and the reports consistent with a design of the at least one equipment component.

2. The method of claim 1, wherein the documents comprise at least one of maintenance requirements, an engineering order, a regulatory directive, a manufacturer service bulletin, an operator service request, and an operator maintenance program.

3. The method of claim 1, wherein the equipment specifications comprise at least one of materials that comprise the at least one equipment component and the subcomponents, component and subcomponent parts, and functional locations of the at least one equipment component within the machine and of the subcomponents in the at least one equipment component.

4. The method of claim 1, wherein the planning task lists comprise at least one of a maintenance activity list of a portion of the maintenance plan and a maintenance activity list of the at least one equipment component.

5. The method of claim 1, wherein the reports comprise at least one of a notification that the at least one equipment component is in compliance with the maintenance requirement, a notification that the at least one equipment component is due for maintenance, a notification that the maintenance plan has been modified, a notification that a new maintenance plan has been created, a notification that maintenance on the at least one equipment component is complete, a notification that maintenance on the machine is complete, and an order to perform maintenance on the at least one equipment component.

6. A graphical user interface for managing a maintenance plan of a machine, comprising:
    a first interface to receive a maintenance request;
    a second interface, triggered in response to the maintenance request, to display the maintenance plan including maintenance documents, equipment specifications, maintenance tasks, maintenance compliance reports of at least one portion of the machine, and relationships between the maintenance documents, the equipment specifications, the maintenance tasks, and the maintenance compliance reports of the at least one portion of the machine.

* * * * *